United States Patent [19]

Suzuki

[11] Patent Number: 4,764,825
[45] Date of Patent: Aug. 16, 1988

[54] TAPE LOADING APPARATUS FOR A TAPE RECORDER

[75] Inventor: Shoji Suzuki, Iwaki, Japan

[73] Assignee: Alpine Electronic Inc., Japan

[21] Appl. No.: 850,723

[22] Filed: Apr. 11, 1986

[30] Foreign Application Priority Data

Apr. 11, 1985 [JP] Japan .............................. 60-54538[U]

[51] Int. Cl.⁴ .......................................... G11B 15/665
[52] U.S. Cl. ........................................ 360/85; 360/95
[58] Field of Search ........... 360/85, 95, 130.21–130.23

[56] References Cited

U.S. PATENT DOCUMENTS

| | | | |
|---|---|---|---|
| 3,660,614 | 5/1972 | Swain et al. | 360/85 |
| 4,092,684 | 5/1978 | Umeda | 360/85 |
| 4,138,699 | 2/1979 | Ura et al. | 360/85 |
| 4,388,658 | 6/1983 | Kajino et al. | 360/85 |
| 4,517,614 | 5/1985 | Straub et al. | 360/85 |
| 4,563,717 | 1/1986 | Fleck et al. | 360/95 |

FOREIGN PATENT DOCUMENTS

55-84070 6/1980 Japan ................................. 360/95

Primary Examiner—Stuart N. Hecker
Assistant Examiner—Benjamin E. Urcia
Attorney, Agent, or Firm—Guy W. Shoup; Leighton K. Chong

[57] ABSTRACT

A loading apparatus for a video tape recorder includes a loading arm, a chassis formed with and a pair of guide holes, a pair of loading set members for setting a tape to a loading position which are guided by the pair of guide holes. In the loading apparatus, a single loading arm is provided. The pair of loading set members are reciprocatingly moved through a pair of connection plates.

2 Claims, 13 Drawing Sheets

TAPE LOADING APPARATUS FOR A TAPE RECORDER

BACKGROUND OF THE INVENTION

1. Field of the Invention

The present invention relates to an improvement in a loading apparatus for a video tape recorder.

2. Description of the Prior Art

A video tape recorder is provided with a loading apparatus which draws a video tape from a cassette to wind it over a rotary head. This conventional loading apparatus has a pair of loading arms rotated by means of a drive source. A pair of loading set members are supported on the loading arms to set the video tape to both loading positions. Power transmission means are interposed between the drive source and the pair of loading arms to rotate the latter through the power transmission means. Each loading set member is reciprocated between a loading position and an unloading position so that when loading takes place. the video tape is drawn from the cassette to wind it over the rotary head whereas when unloading takes place, the video tape is pulled into the cassette.

In the conventional loading apparatus for a video tape recorder, the loading arms and power transmission means are provided on the pair of loading set members, and therefore, the number of parts for the loading apparatus increases to make the structure complicated. In addition, assembling becomes cumbersome and the entire video tape recorder is dfficult to make it compact.

SUMMARY OF THE INVENTION

It is therefore an object of the present invention to provide a loading apparatus which can minimize the number of parts to simplify the structure and facilitate assembling, thus providing a compact video tape recorder.

In accordance with the present invention, there is provided a loading apparatus for a video tape recorder comprising a loading arm rotated by a drive source, a chassis formed with a pair of guide holes which extend from an unloading position to loading positions on both sides of a rotary head, a pair of loading set members for setting a video tape to the loading position, said members being guided by the pair of guide holes, respectively, the pair of loading set members and the loading arm being connected through a pair of swinging connection plates so that as the loading arm rotates, the pair of loading set members may be reciprocated between the loading position and the unloading position.

According to the above-described arrangement, when the loading arm is rotated by the drive source, the pair of connection plates are swung accordingly, and the pair of loading set members are reciprocated between the loading position and the unloading position along the guide holes formed in the chassis to perform loading and unloading of the video tape.

DETAILED DESCRIPTION OF THE INVENTION AND PREFERRED EMBODIMENTS

Figure 6:
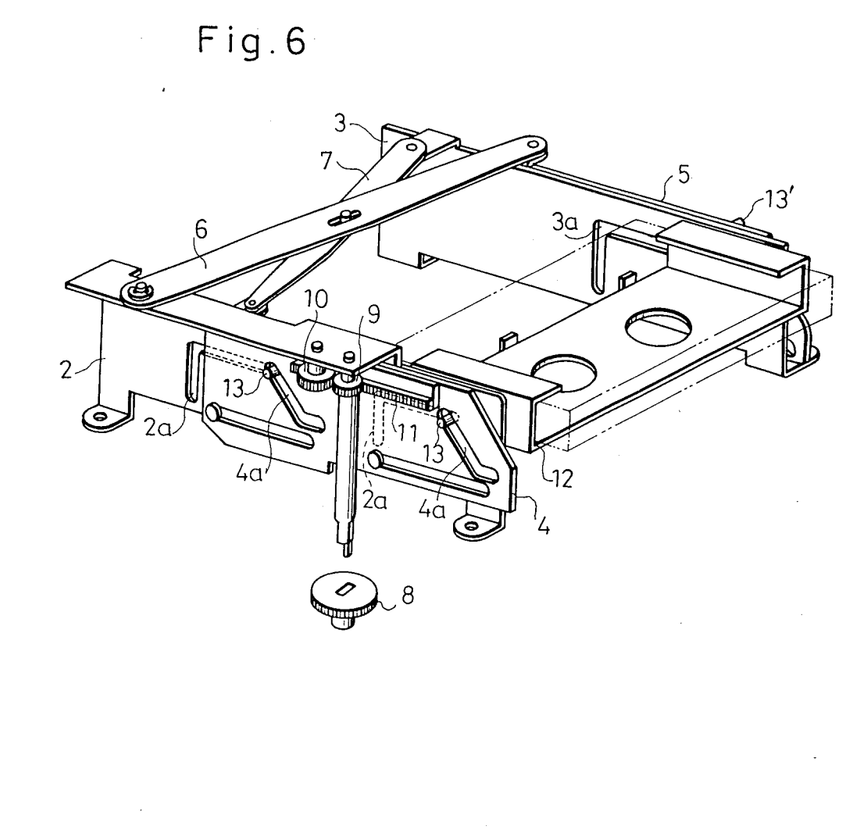
FIG. 6 is a partial exploded perspective view with a chassis of FIG. 1 omitted.

Referring now to FIGS. 1 to 5, a chassis 1 for a video cassette tape recorder has side plates 2, 3 secured to both ends threreof. Slide plates 4, 5 are provided externally of the side plates 2, 3. The slide plates 4, 5 are slidable in a lateral direction (in a direction as indicated at arrow A—A in FIG. 1) and can be moved together through connection plates 6, 7. Reference numerals 8, 9, 10 denote holder lifting gears for moving the slide plates 4, 5 forward and backward. A rack 11 is secured to the slide plate 4 as shown in FIG. 6 and engages the lifting gear 10. A cassette holder 12 is disposed between the side plates 2 and 3. Guide pins 13, 13' are provided on both sides of the cassette holder 12. The side plates 2, 3 are formed with L-shaped guide holes 2a, 3a, and the slide plates 4, 5 are formed with inclined cam holes 4a (one of which is not shown). The guide pins 13, 13' are inserted into the L-shaped guide holes 2a, 3a and inserted into the inclined cam holes 4a (the other of which is not shown). When the slide plates 4, 5 are moved forward and backward, the cassette holder 12 is moved upward and downward by cooperation of the L-shaped guide holes 2a, 3a, the inclined cam holes 4a (the other of which is not shown) and the guide pins 13, 13'. In FIG. 6, the cassette holder 12 is shown at a waiting position before the cassette is set.

Figure 4:
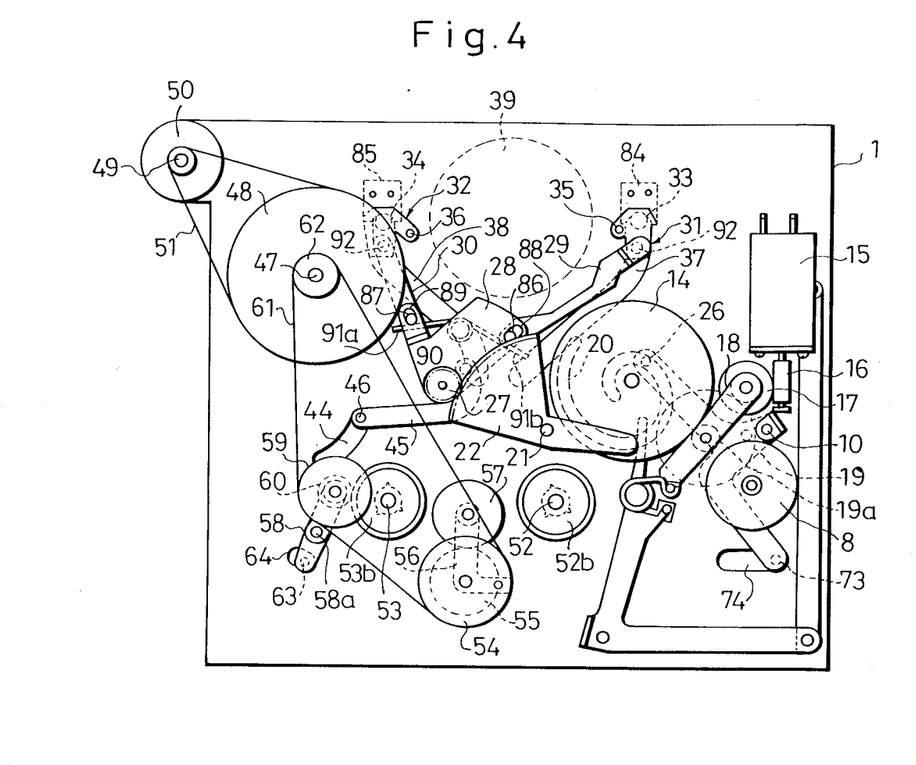
FIG. 4 is a bottom view with a lower panel of FIG. 2 omitted.
Figure 5:
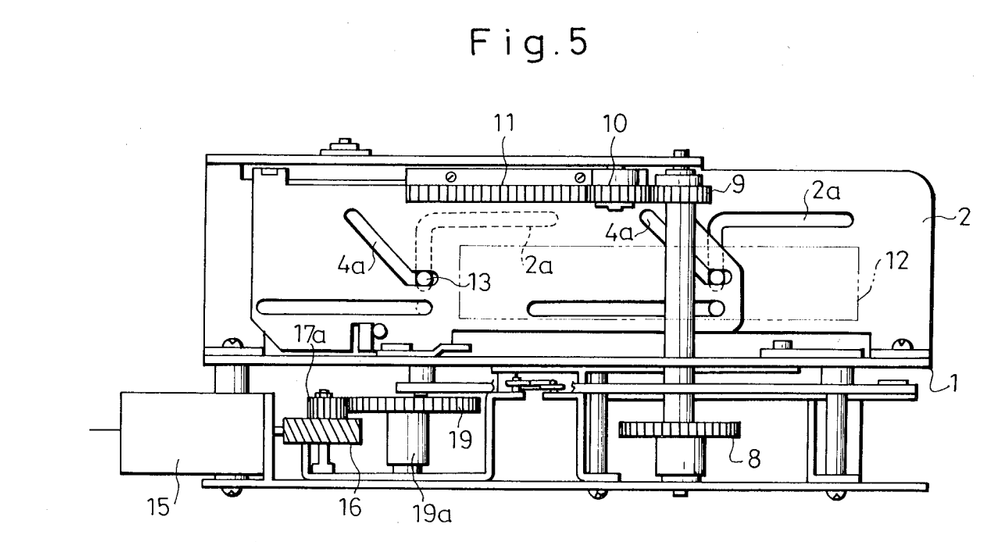
FIG. 5 is a left side view of FIG. 2.
Figure 7:
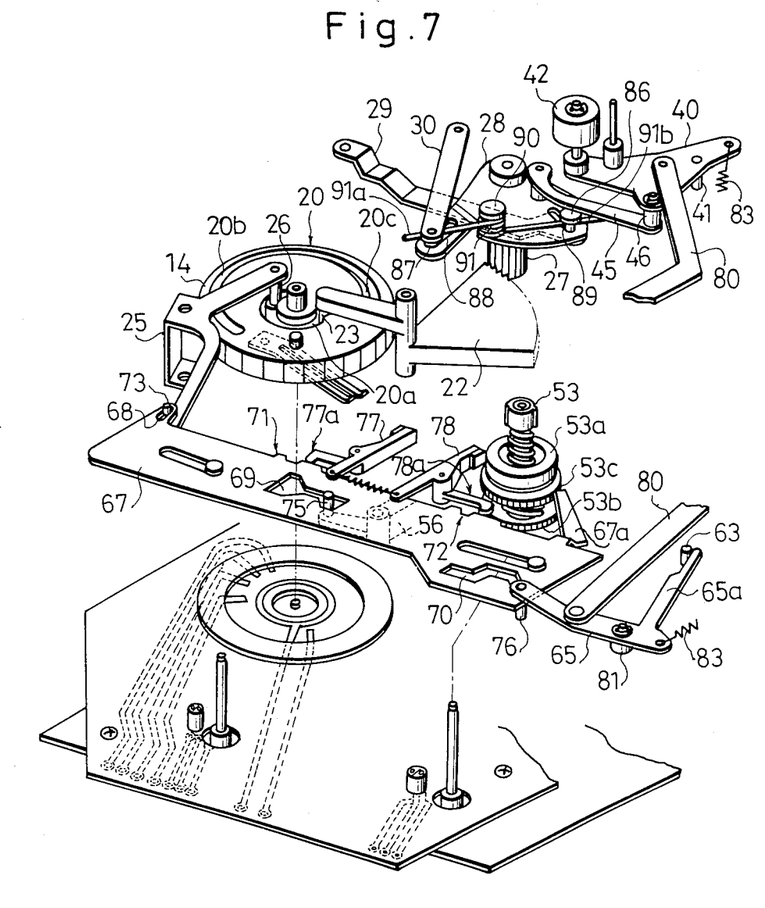
FIG. 7 is an exploded perspective view schematically showing essential parts of FIG. 1.

In FIG. 7, a cam gear 14 is mounted on the chassis 1. Secured to the chassis 1 is a loading motor 15 which is a drive source for the loading apparatus, as shown in FIGS. 1, 2, 4 and 5. Provided on an output shaft of the loading motor 15 is a worm 16 with which meshes a worm wheel 17 mounted on the chassis 1. A swinging lever 18 is provided coaxially on the worm wheel 17, a gear 19 is mounted on the swinging lever 18 as shown in FIG. 4, the gear 19 being meshed with a pinion 17a integral with the worm wheel 17. A switching gear 19a is provided integral with the gear 19. This switching gear 19a is disposed between the gear 8 and the cam gear 14 so that the gear 19a may be selectively meshed with the gear 8 and the cam gear 14.

Figure 8:
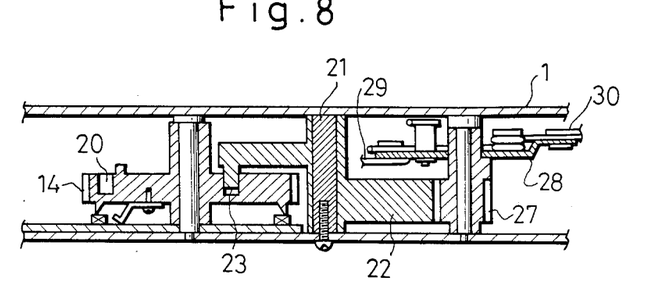
FIG. 8 is a sectional view showing a relationship between a cam gear and a sector gear.

The cam gear is formed with a spiral cam groove 20. This cam groove 20 is composed of an internal small-diameter concentric circular cam portion 20a, an external large-diameter concentric circular cam portion 20b and a cam portion 20c fixed thertо. Inserted into the cam groove 20 are an engaging pin 23 of a sector gear 22 pivoted at 21 to the chassis 1 as shown in FIG. 8 and an engaging pin 26 of a control plate driving lever 25 pivoted at 24 to the chassis 1.

Figure 1:
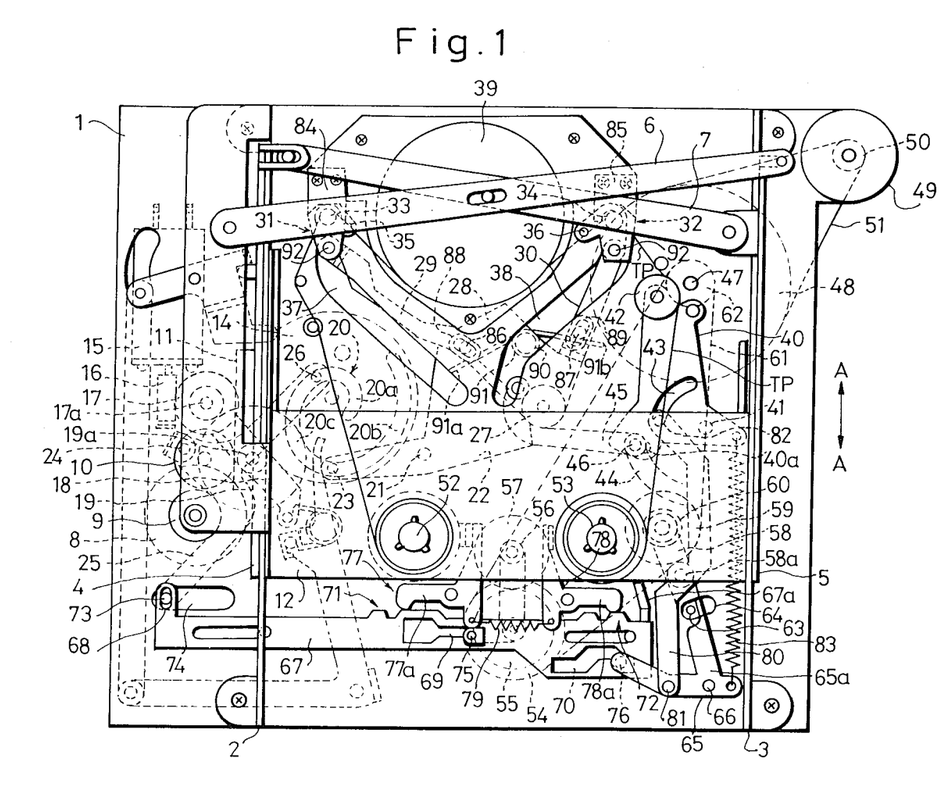
FIG. 1 is a plan view of a video cassette tape recorder showing an arrangement of a loading apparatus according to the present invention.
Figure 2:
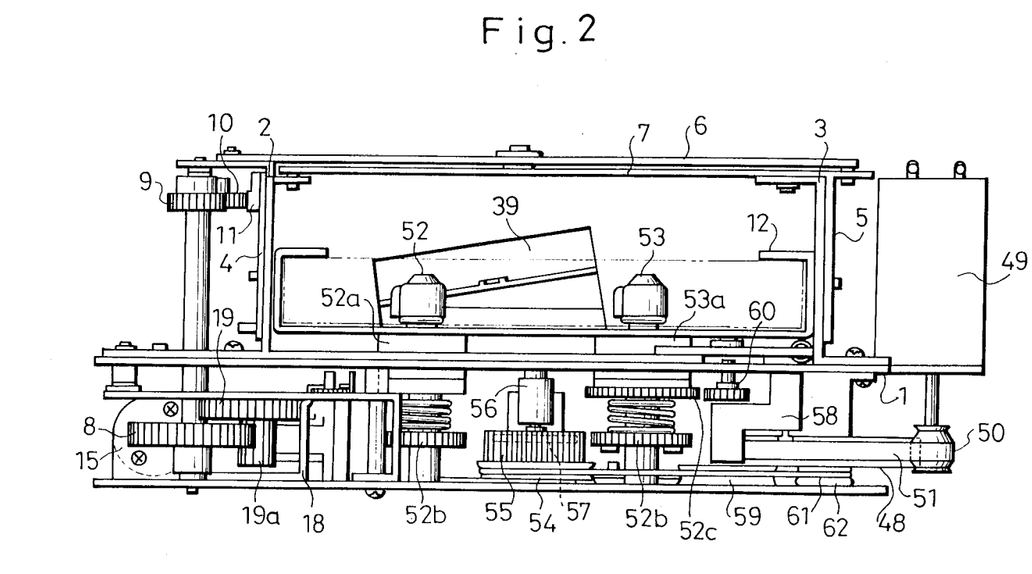
FIG. 2 is a front view of FIG. 1.
Figure 3:
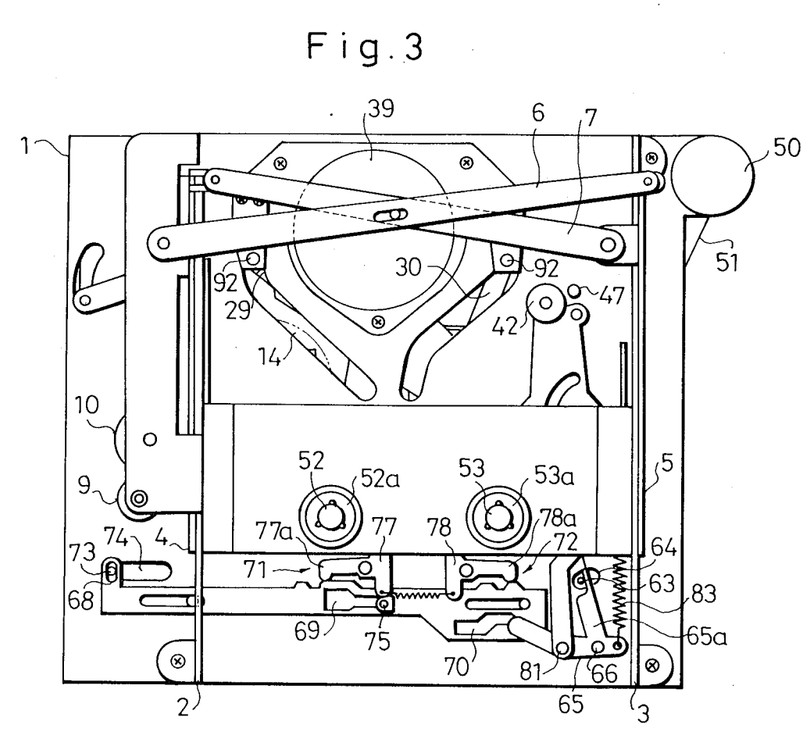
FIG. 3 is a plan view of FIG. 2.
Figure 9:
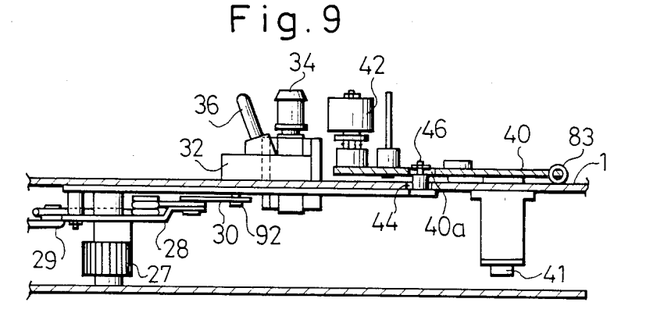
FIG. 9 is a sectional view showing a relationship between a loading arm and a pinch roller support plate shown in FIG. 1.
Figure 10:
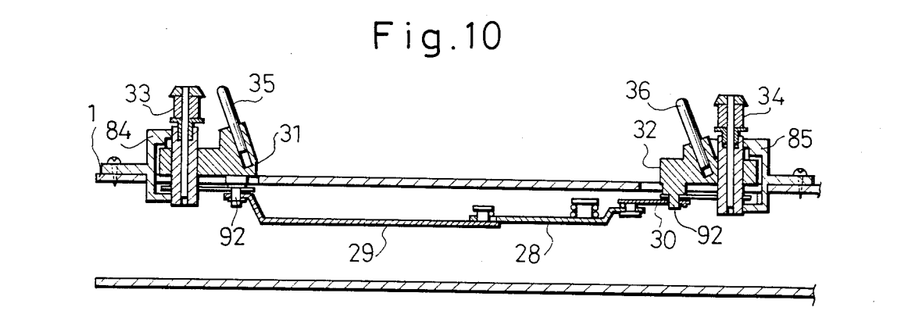
FIG. 10 is a sectional view showing a relationship between a loading arm and a loading set member shown in FIG. 1.

A pinion 27 is meshed with the sector gear 22, the pinion 27 being mounted on the underside of the chassis 1. A loading arm 28 is provided integral with the pinion 27. The cam gear 14, the sector gear 22 and the pinion 27 approximately constitute power transmission means for transitting power of the loading motor 15 to the loading arm 28. Loading set members 31, 32 are provided on the loading arm 28 through connection plates 29, 30, and guide rollers 33, 34 and inclined guide posts 35, 36 are provided on the loading set members 31, 32 as shown in FIGS. 9 and 10. The loading set members 31, 32 are guided along guide holes 37, 38 as shown in FIG. 1. Reference numeral 39 denotes a rotary head.

The loading arm 28, the connection plates 29, 30, the loading set members 31, 32 and the guide holes 37, 38 approximately constitute the loading apparatus for the video tape recorder, the detail of which will be described later. Next, a pinch roller support plate 40 will be described.

The pinch roller support plate 40 is disposed in the proximity of the loading arm 28 (see FIG. 7). The pinch roller support plate 40 has its intermediate portion pivoted at 41 to the chassis 1 as shown in FIG. 9. A pinch roller 42 is mounted on one end of the pinch roller support plate 40. A circular guide slot 43 is formed in a pinch roller support plate portion between the pinch roller support plate 40 and the first pivot 41, and a circular guide slot 44 is formed in the vicinity of the pinch roller support plate 40 on the chassis 1.

One end of a connection link 45 is pivoted to the loading arm 28 as shown in FIG. 7, and a connection shaft 46 is pivoted to the other end of the connection link 45. The connection shaft 46 is inserted into the guide slot 44 and inserted into a slot 40a formed in the pinch roller support plate 40. When the pinch roller support plate 40 is rotated clockwise around the first pivot 41, the pinch roller 41 comes closer to a capstan shaft 47.

The capstan shaft 47 is provided integral with a flywheel 48 as shown in FIG. 1. The flywheel 48 is operatively connected through a pulley 50 and a belt 51 to a drive motor 49 secured to the chassis 1. Reference numeral 52 denotes a supply reel shaft mounted on the chassis 1, 53 a winding reel shaft mounted on the chassis 1, 54 a drive pulley mounted on the chassis 1 between the supply reel shaft 52 and the winding reel shaft 53, and 55 a drive gear integral with the drive pulley 54. An intermediate portion of an L-shaped swinging arm 56 is provided coaxial with the drive gear 55, and an idle gear 57 meshed with the drive gear 55 is mounted on one end of the swinging arm 56. Further, reference numeral 56 denotes an arm pivoted at 58a to the chassis 1 in the proximity of the winding reel shaft 53, 59 a pulley mounted on one end of the arm 58, and 60 an idle gear integral with the pulley 59. The pulley 59 and pulley 54 are operatively connected to a pulley 62 integral with the flywheel 48 through a belt 61. An engaging pin 63 projected on the other end of the arm 58 is projected on the chassis 1 from a slot 64 of the chassis 1.

An intermediate portion of an approximately T-shaped control lever 63 is pivoted at a second pivot 66 to one leading edge end of the chassis 1. A control plate 67 is mounted movably forward and backward relative to the second pivot in the vicinity of the leading edge of the chassis 1. The control plate is formed at one end thereof with a laterally extending slot 68, and is formed at an intermediate portion thereof with an idler controlling cam hole 69. The control plate 67 is formed at the other end thereof with an upwardly bent pinch roller controlling cam hole 70 as shown in FIG. 1. The control plate 67 is formed at one side in the central portion thereof with brake lever control cams 71, 72, and formed at one side on the other side thereof with a clutch pawl 67a projected.

An engaging pin 73 of the control plate driving lever 225 is inserted into the slot 68 through a slot 74 of the chassis 1. A follower pin 75 projected on the swinging arm 56 is inserted into the idler controlling cam hole 69. A follower pin 76 projected on one end of the control lever 65 is inserted into the pinch roller controlling cam hole 70, and arm portions 77a, 78a of T-shaped brake levers 77, 78 pivoted to the chassis 1 are brought into contact with the brake lever control cams 71, 72, respectively. A spring 79 is stretched between distal ends of the brake levers 77, 78, and free ends of the brake levers 77, 78 are placed face to a reel base 52a of the supply reel shaft 52 and a reel base 53a of the winding reel shaft 53, respectively.

One end of a connection plate 80 is pivoted at 81 to a portion between one end of the control lever 63 and the second pivot 66. An engaging pin 82 is projected on the other end of the connection plate 80, the engaging pin 82 being inserted into the slot 43 of the pinch roller support plate 40. A roller pressing spring 83 is stretched between the other end of the pinch roller supplort plate and the other end of the control lever 65. The intermediate arm portion 65a of the control lever 65 is in contact with the engaging pin 63.

Next, the detailed construction of the loading apparatus for the cassette tape recorder constructed as described above will be explained.

Figure 14:
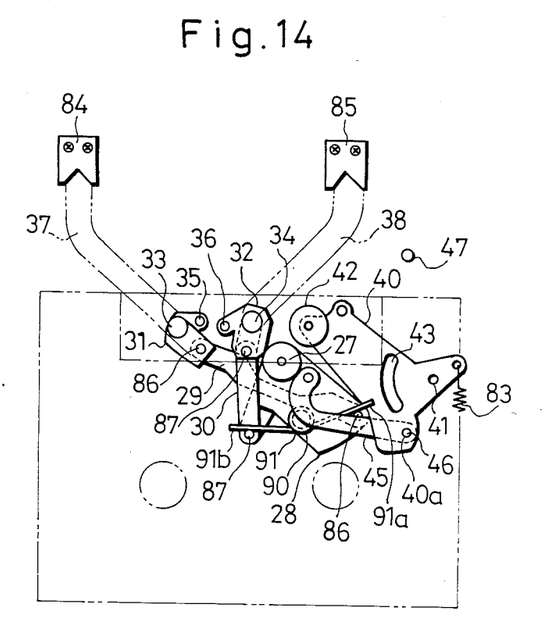
FIGS. 14 and 15 illustrate a relationship between a pinch roller support plate and a loading arm.
Figure 15:
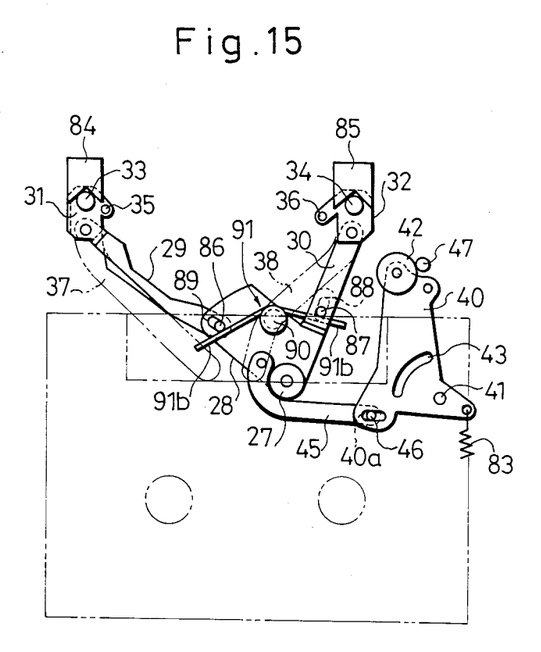

The guide holes 37, 38 are formed in the chassis 1 as shown in FIG. 1. The terminal end of the guide hole near the rotary head 39 is the loading position, and the beginning end of the guide hole on the opposite side is the unloading position. Locating loading blocks 84, 85 for controlling the position of the loading set members 33, 34 are provided at the loading position, the blocks 84, 85 are secured to the chassis 1. Projected from one end of each of the connection plates 29, 30 are connection shafts 86, 87. The loading arm 28 is formed with loose-fit holes 88, 89, and the connection shafts 86, 87 are inserted into the holes 88, 89. A winding shaft 90 is projected in the center of the loading arm 28 with the holes 88, 80 sandwiched therebetween. A torsional coil spring 91 is wound around the winding shaft 90. The torsional coil spring 91 has one end 91a placed in contact with the connection shaft 87 and the other end 91b placed in contact with the connection shaft 86. The loading set members 31, 32 are rotatably supported by a shaft 92 on the other ends of the connection plates 29, 30. The inclined posts 35, 36 are inclined corresponding to an inclined angle of the rotary head 39. The torsional coil spring 91 has a function to bias the connection plates 29, 30 in the unloading direction as shown in FIG. 14 when the video tape is unloaded, whereas biasing the connection plates 29, 30 in the loading direction as shown in FIG. 15 when the tape is loaded.

In the following, the operation of the loading apparatus for the cassette tape recorder will be described along with other structures and setting conditions.

In FIG. 1, the swinging lever 18 is rotated toward the cam gear 14 to cause the switching gear 19a to mesh with the cam gear 14. Then, this rotation is transmitted to the cam gear 14 through the worm 16, the worm wheel 17, the gear 19 and the switching gear 19a. Thereby, the cam gear 14 is rotated clockwise or counterclockwise. At this time, the sector gear 22 is rotated about the axis 21 counterclockwise or clockwise by the action of the cam groove 20 and engaging pin 23. On the other hand, the control plate driving lever 25 is rotated counterclockwise or clockwise by the action of the cam groove 20 and engaging pin 26. The rotational operations of the sector gear 22 and control plate driving lever 25 may be performed alternately by the action of the cam groove 20.

Figure 11:
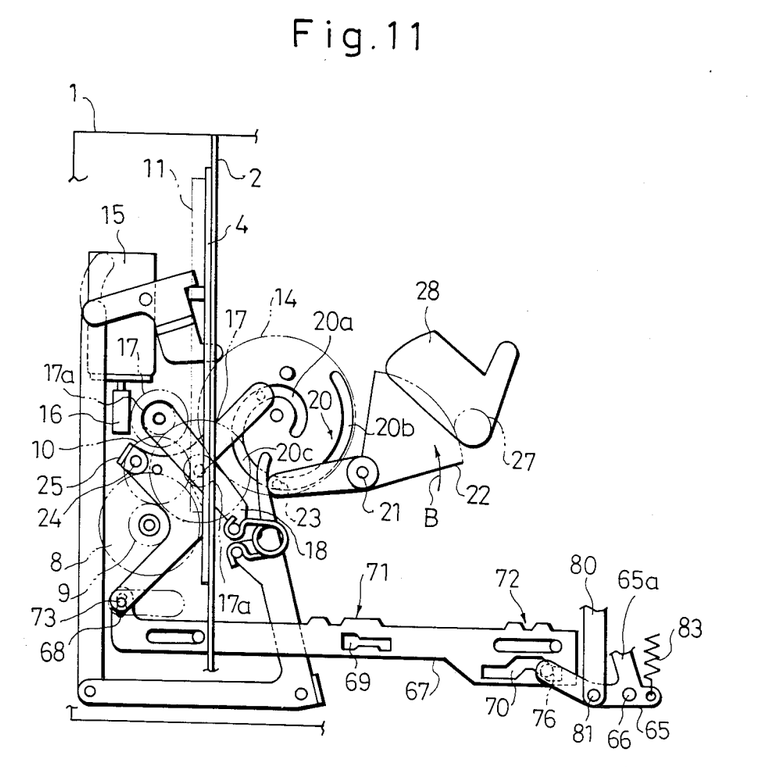
FIG. 11 illustrates the portions around the cam gear of FIG. 1.

The semiclockwise rotation of the sector gear 22 (rotation in the direction indicated at B of FIG. 11) is transmitted to the loading arm 28 through the pinion 27 to rotate the loading arm 28 clockwise. Thereby, the loading set members 31, 32 are reciprocated toward the loading positions on both sides of the rotary head 39 along the guide holes 37, 38. At that time, the pinch roller support plate 49 is also rotated clockwise by the connection link 45 as shown by the arrow C in FIG 12.

On the other hand, the rotation of the control plate driving lever 25 is transmitted to the control plate 67 through the slot 68 and engaging pin 73 whereby the control plate 67 is slidably displaced rightward or leftward in FIG. 1.

Figure 12:
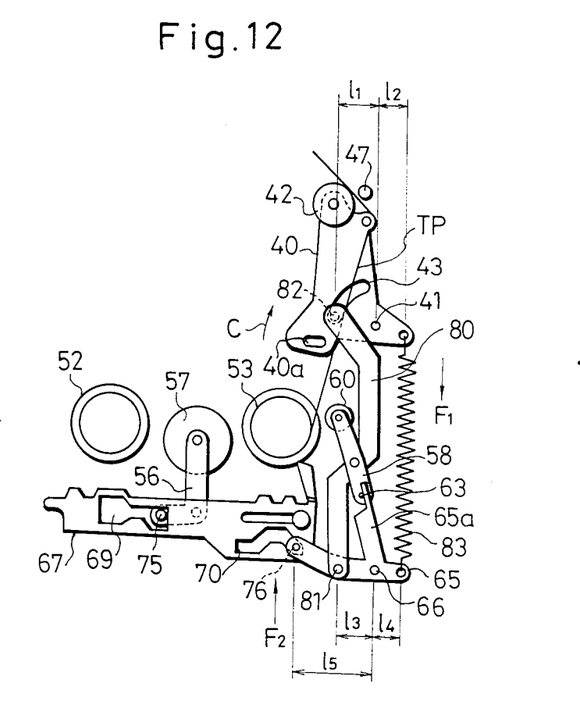
FIGS. 12 and 13 illustrate a relationship between a control plate and a pinch roller support plate in FIG. 1.

As this sliding displacement occurs, when the follower pin 76 is at the right end of the pinch roller controlling cam hole 70, the follower pin 75 is positioned at the right end of the idler controlling cam hole 69. At this position, the follower pin 75 is restricted in upward displacement but not restricted in downward displacement. Thus, the swinging arm 56 can be turned leftward but cannot be turned rightward. Therefore, the idle gear 57 can mesh with the reel gear 52b of the supply reel shaft 52 but cannot mesh with the reel gear 53b of the winding reel shaft 53. Also, at this position, since the intermediate arm portion 65a of the control lever 65 presses the engaging pin 63 of the arm 58 against the resiliency of the belt 61 as shown in FIG. 12, the idle gear 60 of the arm 58 is parted from the clutch 53c of the winding reel shaft 53.

Figure 13:
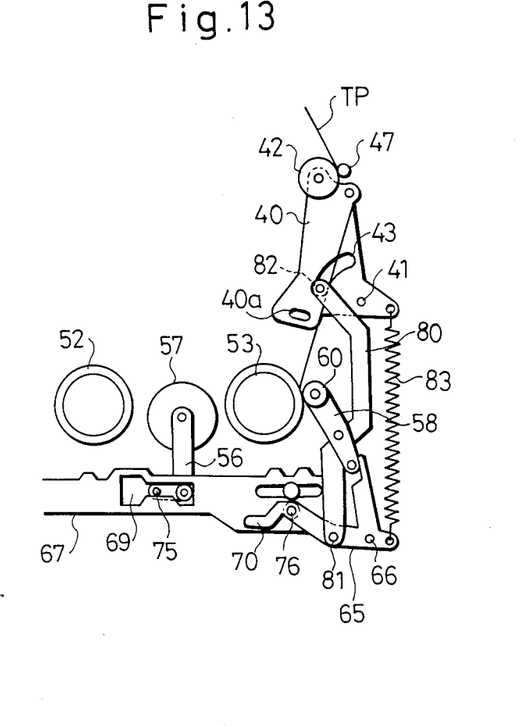

When the control plate 57 moves rightward from said position to move the follower pin 76 to the top of the central bent portion of the pinch roller controlling cam hole 70 as shown in FIG. 13, the control lever 65 is rotated clockwise around the second pivot 66 against the resiliency of the roller pressing spring 83. Thereby, the pressing of the engaging pin 63 by the intermediate arm portion 65a of the control lever 65 is released, and the arm 58 is rotated toward the clutch gear 53c by the resiliency of the belt 61 with the result that the idle gear 60 is brought into engagement with the clutch gear 53c. At that time, the connection plate 80 is displaced upwardly, and the pinch roller support plate 40 is rotated clockwise around the first pivot 41 from the pressible position toward the pressing position by the force of the roller pressing spring 83 with the result that the pinch roller 42 brings the tape TP into pressure contact with the capstan shaft 47. At that time, the slot 42a rotates the pinch roller support plate 40 without being restricted by the connection link 45. At this position, the upward and downward movements of the follower pin 76 are restricted by the action of the narrow portion of the idler controlling cam hole 70, the idle gear 57 is at the neutral position relative to the reel gears 52b, 53b.

When the control plate 67 is displaced rightward and the follower pin 76 is moved to the left end of the pinch roller controlling cam hole 70, the control lever 65 is rotated counterclockwise around the second pivot 66 by means of the force of the roller pressing spring 83. Thereby, the connection plate 80 is displaced downwardly in FIG. 1, and the pinch roller support plate 40 is rotated counterclockwise around the first pivot 41 toward the pressible position with the result that the pinch roller 42 is parted from the capstan shaft 47. Since at this position, the follower pin 75 is displaced within the narrow portion of the idler controlling cam hole 69, the follower pin 75 may be displaced upward and downward. Thereby, the swinging arm 56 is rotated rightward or leftward according to the rotating direction of the drive gear 55 so that the idle ger 57 is meshed with the reel gear 52b or 53b to rewind and quickly feed the tape TP.

In the loading apparatus for the video tape recorder in accordance with the present invention, a single loading arm is used and a pair of loading set members for setting a video tape to a loading position are reciprocated through a pair of connection plates. With this arrangement, the loading apparatus can be constituted by the decreased number of parts as compared with the conventional loading apparatus to simplify the structure and facilitate assembling, and in addition, the entire video tape recorder may be made compact. The present invention has various advantages as just mentioned.

What is claimed is:

1. A tape loading apparatus in a tape recorder unit for loading a tape from a cassette inserted in the tape recorder unit around a head member mounted in the tape recorder unit spaced apart from the position of the inserted cassette, comprising:
    a chassis in the tape recorder unit having a pair of guide slots each extending from an unloaded position on a side of the tape facing away from the head member in the interior of the cassette for drawing the tape out of the cassette to a loaded position in which respective ends of said slots are located on opposite sides of the head member from each other;
    a pair of loading set members engaging the tape in the inserted cassette and each being movable along a respective one of said pair of guide slots for drawing the tape from the unloaded position to the loaded position around the head member and for returning the tape back to the unloaded position;
    a loading arm connected to a drive source in the tape recorder unit and rotatable by the drive source for moving said loading set members to load the tape from the cassette to the loaded position around the head member and to return the tape from the head member back to the unloaded position;
    a pair of connection plates each having two ends, one end of each connection plate being pivotally connected to said loading arm, and the respective other ends of said connection plates being connected individually to a respective one of said loading set members;
    wherein said one ends of said connection plates pivotally connected to said loading arm each have a connection shaft fixed thereon, and said loading arm has a pair of holes through which said connection shafts are inserted and a winding shaft between said holes; and
    a single torsional coil spring having its center mounted on said winding shaft of said loading arm, said coil spring having two ends each placed in contact with a respective one of said connection shafts of said connection plates, wherein, relative to a reference line connecting the two connection shafts, the center of the coil spring is located on one side of said reference line when said loading arm is rotated by said drive source to bring the tape to the loaded position, so that said single coil spring biases said connection plates to move said loading set members to the loaded position, and the center of the coil spring is located on the other side of said reference line when said loading arm is rotated to bring the tape to the unloaded position, so that said single coil spring biases said connection plates to move said loading set members to the unloaded position.

2. A tape loading apparatus according to claim 1, wherein the tape recorder unit is a video tape recorder and the head member is a rotary cylindrical head drum.

* * * * *